US010960542B2

(12) United States Patent
Hirabayashi

(10) Patent No.: US 10,960,542 B2
(45) Date of Patent: Mar. 30, 2021

(54) CONTROL DEVICE AND ROBOT SYSTEM

(71) Applicant: Seiko Epson Corporation, Tokyo (JP)

(72) Inventor: Hiroto Hirabayashi, Matsumoto (JP)

(73) Assignee: Seiko Epson Corporation

( * ) Notice: Subject to any disclaimer, the term of this patent is extended or adjusted under 35 U.S.C. 154(b) by 379 days.

(21) Appl. No.: 16/003,476

(22) Filed: Jun. 8, 2018

(65) Prior Publication Data

US 2018/0354133 A1 Dec. 13, 2018

(30) Foreign Application Priority Data

Jun. 9, 2017 (JP) .............................. JP2017-114063

(51) Int. Cl.
*G06F 17/00* (2019.01)
*B25J 9/16* (2006.01)

(52) U.S. Cl.
CPC ............. *B25J 9/1666* (2013.01); *B25J 9/163* (2013.01); *B25J 9/1694* (2013.01); *G05B 2219/40586* (2013.01); *G05B 2219/49143* (2013.01); *G05B 2219/50111* (2013.01)

(58) Field of Classification Search
CPC ........ B25J 9/1666; B25J 9/163; B25J 9/1694; G05B 2219/40586; G05B 2219/49143; G05B 2219/50111
USPC ........................................................ 700/255
See application file for complete search history.

(56) References Cited

U.S. PATENT DOCUMENTS

| 2005/0166413 | A1* | 8/2005 | Crampton | B25J 13/088 33/503 |
| 2011/0036188 | A1* | 2/2011 | Fujioka | F16H 35/10 74/405 |
| 2011/0046780 | A1* | 2/2011 | Anderson | G05D 1/0274 700/248 |
| 2011/0213497 | A1* | 9/2011 | Nair | B25J 9/1666 700/255 |
| 2014/0152507 | A1* | 6/2014 | McAllister | H01Q 1/362 342/126 |
| 2015/0190925 | A1* | 7/2015 | Hoffman | B25J 9/1671 700/257 |
| 2015/0251315 | A1* | 9/2015 | Brandenberger | G01N 35/0099 700/255 |

(Continued)

FOREIGN PATENT DOCUMENTS

JP 05-084681 A 4/1993

*Primary Examiner* — Ronnie M Mancho
(74) *Attorney, Agent, or Firm* — Harness, Dickey & Pierce, P.L.C.

(57) ABSTRACT

A control device comprising: a processor controls a robot having a robot arm and accept a command from an input unit which enables an input operation; and a storage that stores information about a driving of the robot, wherein the processor carries out first drive control to move a predetermined part of the robot arm or of an end effector connected to the robot arm from a first position toward a second position if the processor accepts a first command to move the predetermined part, and second drive control to move the predetermined part in such a way as to return along at least a part of a route which the predetermined part traces when moving from the first position toward the second position, based on the information stored in the storage, if the processor accepts a second command to retract the predetermined part after the first command.

14 Claims, 16 Drawing Sheets

(56) References Cited

U.S. PATENT DOCUMENTS

| | | | |
|---|---|---|---|
| 2015/0306770 A1* | 10/2015 | Mittal | B25J 19/027 |
| | | | 700/255 |
| 2016/0207197 A1* | 7/2016 | Takahashi | B25J 9/1676 |
| 2017/0189131 A1* | 7/2017 | Weir | A61B 90/361 |
| 2019/0061165 A1* | 2/2019 | Rajendran | B25J 15/0014 |

* cited by examiner

CONTROL DEVICE AND ROBOT SYSTEM

BACKGROUND

1. Technical Field

The present invention relates to a control device, and a robot system.

2. Related Art

According to the related art, an industrial robot having a robot arm and an end effector installed at the distal end of the robot arm has been known. Recently, a technique for preventing a robot arm from colliding with a foreign matter or the like when driving the robot arm has been developed (see, for example, JP-A-5-84681).

For example, JP-A-5-84681 discloses a technique of moving (retracting) a robot arm colliding with a foreign matter to a position not in contact with the foreign matter and then stopping driving the robot arm. Such a technique detects whether the robot arm collides with a foreign matter or not, based on a preset speed command value and a feedback value resulting from a collision of the robot arm with a foreign matter.

However, the technique described in JP-A-5-84681 does not disclose any direction in which the robot arm is moved (retracted) to a position not in contact with a foreign matter. Depending on the direction of movement, the robot arm may come into contact with another foreign matter. Also, the technique described in JP-A-5-84681 retracts the robot arm, triggered by the contact with the foreign matter, and cannot retract the robot arm intentionally.

SUMMARY

An advantage of some aspects of the invention is to solve at least a part of the problems described above, and the invention can be implemented as the following application examples or forms.

A control device according to an application example controls driving of a robot having a robot arm. The control device includes: an accepting unit which accepts a command from an input unit which enables an input operation; a control unit which control driving of the robot in response to the command accepted by the accepting unit; and a storage unit which stores information about the driving of the robot. The control unit carries out first drive control to move a predetermined part of the robot arm or of a member connected to the robot arm from a first position toward a second position if the accepting unit accepts a first command to move the predetermined part, and second drive control to move the predetermined part in such a way as to return along at least a part of a route which the predetermined part traces when moving from the first position toward the second position, based on the information stored in the storage unit, if the accepting unit accepts a second command to retract the predetermined part after the first command.

Such a control device can carry out the second drive control and thus return the predetermined part to the previous position along at least a part of the route, for example, if the robot arm comes into contact with an obstacle or the like. Therefore, the risk of the robot arm coming into contact with another obstacle or the like when returning can be reduced. Also, the control device can carry out the second drive control in response to the second command inputted from the input unit and therefore can return the predetermined part to the previous position according to the intention of the operator.

In the control device according to the application example, it is preferable that the control unit carries out the second drive control if the accepting unit accepts the second command after the driving of the robot is temporarily stopped.

With this configuration, the second drive control can be carried out accurately and stably.

In the control device according to the application example, it is preferable that the control unit, in the second drive control, drives the robot arm in such a way that the predetermined part returns to a taught point taught in the first drive control or a preset taught point.

With this configuration, the risk of the robot arm coming into contact with another obstacle or the like when returning the predetermined part can be reduced. Also, various kinds of work (for example, teaching) can be resumed from the taught point where the predetermined part returns. This can eliminate the time and effort of doing the various kinds of work all over again.

In the control device according to the application example, it is preferable that the control unit, in the second drive control, drives the robot arm in such a way that the predetermined part returns, tracing a plurality of the taught points.

With this configuration, the predetermined part can return, tracing the route. This can further reduce the risk of the robot arm coming into contact with another obstacle or the like.

In the control device according to the application example, it is preferable that the control unit, in the first drive control, causes the storage unit to store a position of the predetermined part as a stored point if the accepting unit accepts a storage command to store the position of the predetermined part without teaching the position, and that the control unit, in the second drive control, drives the robot arm in such a way that the predetermined part returns to the stored point.

With this configuration, the risk of the robot arm coming into contact with another obstacle or the like when returning the predetermined part can be reduced further, without teaching. Also, for example, various kinds of work can be resumed from the stored point where the predetermined part returns. This can eliminate the time and effort of doing the work all over again.

In the control device according to the application example, it is preferable that the control unit, in the first drive control, causes the storage unit to store a plurality of the stored points, and that the control unit, in the second drive control, drives the robot arm in such a way that the predetermined part returns, tracing a part of the plurality of the stored points.

With this configuration, the predetermined part can return, tracing the route. This can further reduce the risk of the robot arm coming into contact with another obstacle or the like. Also, since the predetermined part can return tracing a part of the plurality of stored points, the efficiency of the second drive control can be increased. Moreover, the number of stored points stored in the storage unit can be reduced and the control device can be simplified.

In the control device according to the application example, it is preferable that the control unit, in the first drive control, causes the storage unit to store a plurality of transit points on the route traced by the predetermined part, on a predetermined cycle, and that the control unit, in the second drive control, drives the robot arm in such a way that the predetermined part returns to an arbitrary transit point, of the plurality of transit points.

With this configuration, the predetermined part can be returned to the previous position without teaching. Also, the operator's request to go back by a predetermined time can be met.

In the control device according to the application example, it is preferable that the control unit, in the second drive control, drives the robot arm in such a way that the predetermined part returns, tracing a part of the plurality of transit points.

With this configuration, since the predetermined part can be returned, tracing a part of the plurality of transit points, the efficiency of the second drive control can be increased. Also, the number of transit points stored in the storage unit can be reduced and the control device can be simplified.

In the control device according to the application example, it is preferable that a force detection device can be installed on the robot, and that if the accepting unit accepts that the robot or the member is in contact with a target object, based on an output from the force detection device, the control unit drives the robot arm in such a way that the predetermined part returns to a position where the robot or the member is not in contact with the target object.

This can further reduce the risk of the robot arm coming into contact with another obstacle or the like when retracting the predetermined part from the target object.

In the control device according to the application example, it is preferable that an image pickup device can be installed on the robot, and that if the accepting unit accepts that a part of the robot or a part of the member appears in a picked-up image by the image pickup device, based on an output from the image pickup device, the control unit drives the robot arm in such a way that the predetermined part returns to a position where a part of the robot or a part of the member does not appear in the field of vision of the image pickup device and therefore in the picked-up image.

This can further reduce the risk of the robot arm coming into contact with another obstacle or the like when returning the predetermined part to a position where a part of the robot or of the member does not appear in the picked-up image.

A robot according to an application example is controlled by the control device according to this application example.

Such a robot can reduce the risk of coming into contact with an obstacle or the like and therefore can carry out work more safely and more efficiently.

A robot system according to an application example includes: the control device according to this application example; and the robot controlled by the control device.

In such a robot system, under the control of the control device, the risk of the robot coming into contact with an obstacle or the like can be reduced, and the robot can carry out work more safely and more efficiently.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of a control device, a robot, and a robot system will be described in detail with reference to the accompanying drawings. In each illustration, some parts may be suitably enlarged or reduced or may be omitted in order to make parts to be explained recognizable. In this specification, the term "connection" includes both direction connection and indirect connection via an arbitrary member.

Basic Configuration of Robot System

Figure 1:
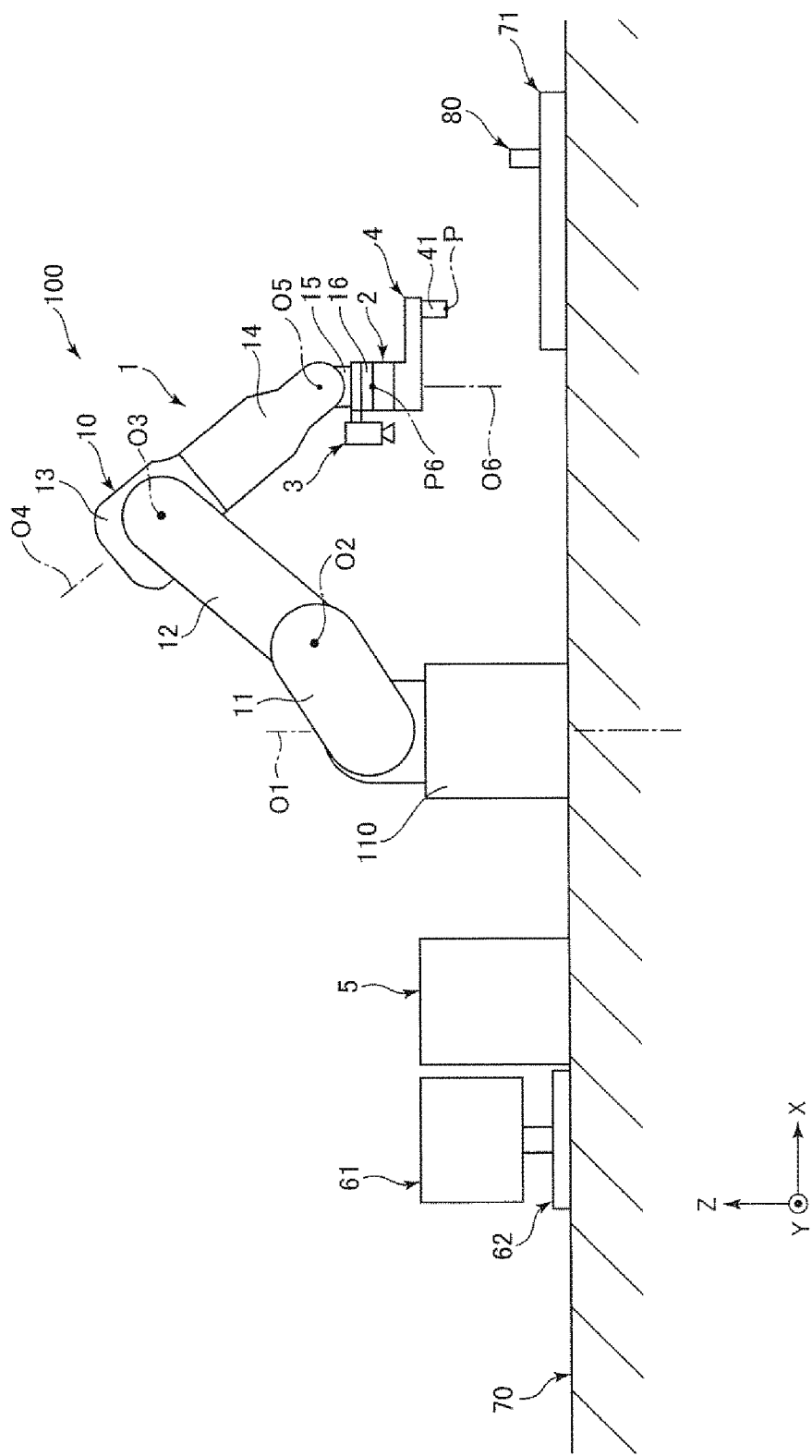
FIG. 1 is a schematic side view showing a robot system according to a first embodiment.
Figure 2:
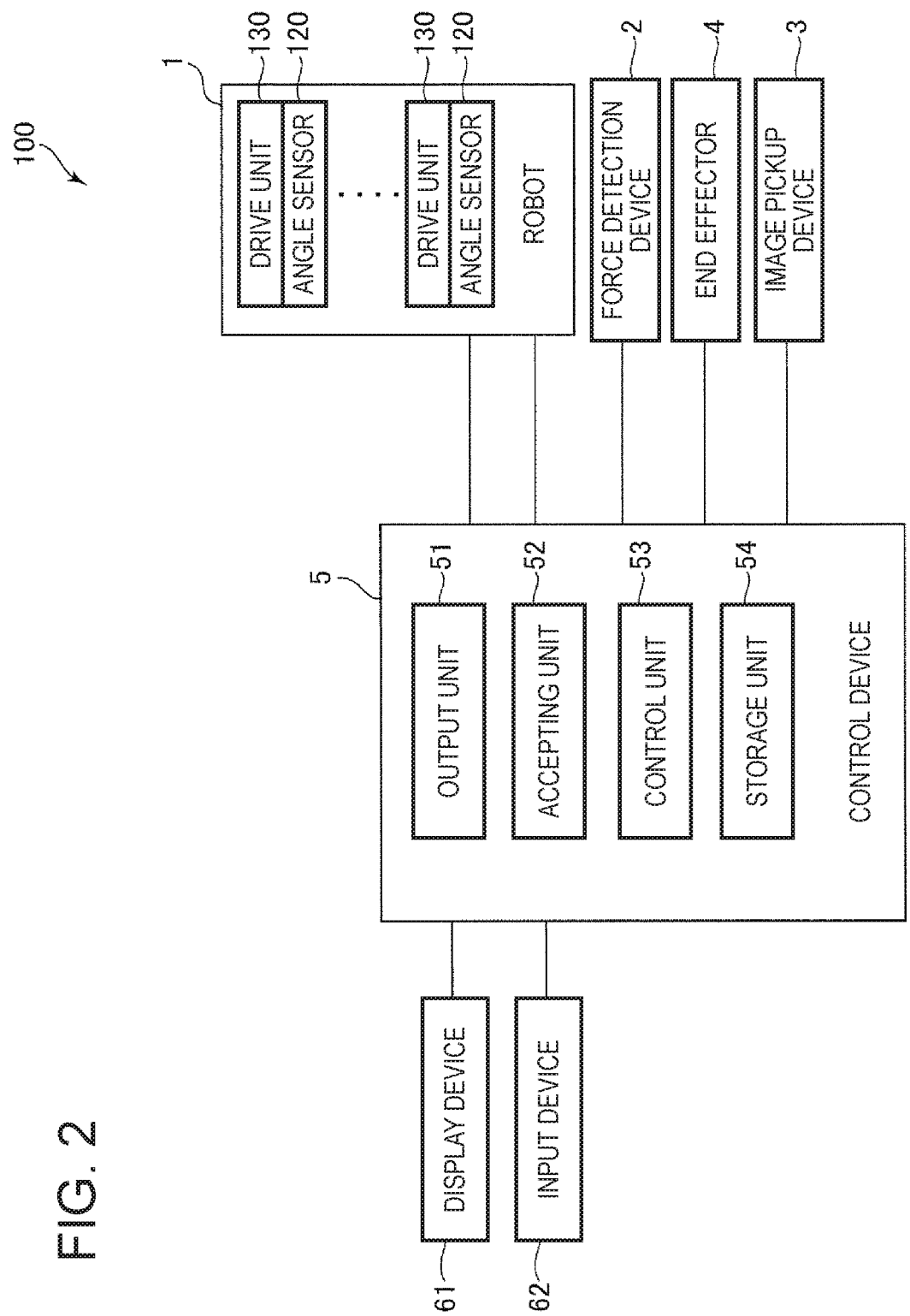
FIG. 2 is a system configuration view of the robot system shown in FIG. 1.

FIG. 1 is a schematic side view showing a robot system according to a first embodiment. FIG. 2 is a system configuration view of the robot system shown in FIG. 1.

In the description below, the base side in FIG. 1 is referred to as a "proximal end" and the opposite side (end effector 4 side) is referred to as a "distal end". FIG. 1 also shows three axes (X-axis, Y-axis, and Z-axis) orthogonal to each other, as a base coordinate system for a robot 1. In the description below, a direction parallel to the X-axis is referred to as an "X-axis direction", a direction parallel to the Y-axis id referred to as a "Y-axis direction", and a direction parallel to the Z-axis id referred to as a "Z-axis direction". In the description below, the distal side of each arrow in the illustrations is referred to as "+ (positive)", and the proximal side is referred to as "− (negative)". The Z-axis direction coincides with a "vertical direction". A direction parallel to an X-Y plane coincides with a "horizontal direction".

In this specification, the term "horizontal" includes a tilt within a range of ±5 degrees or less from horizontal. Similarly, in this specification, the term "vertical" includes a tilt within a range of ±5 degrees or less from vertical. The term "parallel" includes not only two lines (including axes) or planes being perfectly parallel to each other but also two lines or planes being tilted at ±5 degrees or less from each other. Also, in this specification, the term "orthogonal" includes not only two lines (including axes) or planes intersecting each other at an angle of 90 degrees but also two lines or planes being tilted at ±5 degrees or less from 90 degrees.

A robot system 100 shown in FIG. 1 includes a robot 1, a force detection device 2 provided on the robot 1, an end effector 4 provided on the force detection device 2, an image pickup device 3 provided on the robot 1, a control device 5 which controls the driving of the robot 1, a display device 61, and an input device 62 (input unit). In this embodiment, the force detection device 2, the end effector 4, and the image pickup device 3 are separate bodies from the robot 1. However, the robot 1 may include each of these components.

Each part of the robot system 100 will be described in order below.

Robot

The robot 1 shown in FIG. 1 is a 6-axis vertically articulated robot. This robot 1 has a base 110 and a robot arm 10 rotatably connected to the base 110. As shown in FIG. 2, the robot 1 also has a plurality of drive units 130 and a plurality of angle sensors 120.

In this embodiment, as shown in FIG. 1, the robot 1 is provided, for example, on a floor 70 (installation site). While the base 110 is fixed to the floor 70 in this embodiment, the base 110 itself may be movable, provided the robot arm 10 is connected to the base 110. The base 110 may be provided at other sites than the floor 70, for example, on a ceiling or the like.

The robot arm 10 has a first arm 11 (arm), a second arm 12 (arm), a third arm 13 (arm), a fourth arm 14 (arm), a fifth arm 15 (arm), and a sixth arm 16 (arm). These arms 11 to 16 are connected in this order from the proximal end toward the distal end. The first arm 11 is connected to the base 110.

The first arm 11 is rotatable relative to the base 110 about a first axis of rotation O1 along a vertical direction. The second arm 12 is rotatable relative to the first arm 11 about an axis of rotation O2 along a horizontal direction. The third arm 13 is rotatable relative to the second arm 12 about a third axis of rotation O3 along the horizontal direction. The fourth arm 14 is rotatable relative to the third arm 13 about a fourth axis of rotation O4 orthogonal to the third axis of rotation O3. The fifth arm 15 is rotatable relative to the fourth arm 14 about a fifth axis of rotation O5 orthogonal to the fourth axis of rotation O4. The sixth arm 16 is rotatable relative to the fifth arm 15 about a sixth axis of rotation O6 orthogonal to the fifth axis of rotation O5. Here, a point at which a distal end surface of the sixth arm 16 situated at the most distal end of the robot arm 10 intersects the sixth axis of rotation O6 is referred to as a predetermined point P6.

As shown in FIG. 2, the robot 1 has a plurality of drive units 130, each having a motor which rotates one arm relative to the other arm (or the base 110), and a decelerator or the like. In this embodiment, the robot 1 has the same number of drive units 130 as the arms 11 to 16 (in this embodiment, six). Although not illustrated, the plurality of drive units 130 are provided in the corresponding arms 11 to 16.

As the motor of each drive unit 130, for example, a servo motor such as an AC servo motor or DC servo motor can be used. As the decelerator, a planetary gear decelerator or a strain wave gearing device or the like can be used. Each drive unit 130 is controlled by the control device 5 via a motor driver, not illustrated.

Each drive unit 130 is provided with an angle sensor 120 such as a rotary encoder. The angle sensor 120 can detect the angle of rotation of the axis of rotation (not illustrated) of the motor or the decelerator provided in each drive unit 130. Thus, information such as the angle (attitude) of the arm on the distal side relative to the arm on the proximal side can be acquired.

The robot 1 as described above is controlled by the control device 5, described later. Therefore, under the control of the control device 5, the risk of the robot 1 coming into contact with an obstacle can be reduced. The robot 1 can thus position the distal end part of the robot arm 10 and the end effector 4 accurately and easily at a target site in a three-dimensional space (in a real space). Thus, the robot 1 can carry out work or the like more safely and more efficiently.

As described above, the robot 1 is a vertically articulated robot. Thus, the robot 1 can position the distal end part of the robot arm 10 and the end effector 4 at a target site and can realize work of higher quality.

In this embodiment, the number of arms provided in the robot 1 is six. However, the number of arms may be one to five and may be seven or more. If the end effector 4 is provided at the distal end part of the robot arm 10, it is preferable that the number of arms (number of axes of rotation) is at least three or more in order to position the distal end part of the end effector 4 at a target site in a three-dimensional space.

In this embodiment, the arms 11 to 16 are rotatable relative to the neighboring arms or the base 110. However, the robot arm 10 may have arms translatable relative to the neighboring arms or the base 110. In that case, a position sensor made up of a linear encoder can be used instead of the angle sensor 120.

Force Detection Device

As shown in FIG. 1, the force detection device 2 is removably installed at a distal end part of the sixth arm 16. The force detection device 2 is a force detector (force sensor) which detects a force (including a moment) applied to the end effector 4. In this embodiment, as the force detection device 2, a 6-axis force sensor which can detect six components, that is, translational force components Fx, Fy, Fz in the directions of three axes orthogonal to each other (x-axis, y-axis, z-axis) and rotational force components (moments) Mx, My, Mz about the three axes. The force detection device 2 outputs the detected force detection information to the control device 5.

The force detection device 2 is not limited to a 6-axis force sensor and may be, for example, a 3-axis force sensor or the like.

Such a force detection device 2 is installed on the robot 1. Therefore, the control device 5, described later, can detect contact or the like of the end effector 4 with an obstacle, based on the result of detection by the force detection device 2. This enables the robot 1 to easily carry out an obstacle avoidance movement and a target object damage avoidance movement or the like. The robot 1 can thus execute work more safely.

End Effector

At a distal end part of the force detection device 2, the end effector 4 is removable installed. The end effector 4 a target object 80 is an instrument to carry out work on the target object 80 and has the function of holding the target object 80. The term "holding" includes gripping, sucking and the like.

The end effector 4 in this embodiment has a part protruding outward from the sixth arm 16 as viewed from the direction of the sixth axis of rotation O6 and has a grip section 41 at a distal end part which is capable of gripping the target object 80. In this embodiment, the grip section 41 is made up of a hand with two fingers. The distal end of the grip section 41 (the center between the tips of the two fingers) is defined as a tool center point P (predetermined part).

The end effector 4 may have any configuration that enables the end effector 4 to work on the target object 80. For example, the end effector 4 may have a suction mechanism to suck the target object 80.

Image Pickup Device

The image pickup device 3 is removably installed on the robot arm 10. More specifically, the image pickup device 3 is installed on the fifth arm 15. The image pickup device 3 has the function of picking up an image of the target object 80 placed on, for example, a workbench 71.

The image pickup device 3 has an image pickup element made up of a CCD (charged coupled device) image sensor having a plurality of pixels, and a lens (optical system), though not illustrated. This image pickup device 3 causes light from an image pickup target or the like to form an image on a light receiving surface of the image pickup element via the lens, converts the light into an electrical signal, and outputs the electrical signal to the control device 5.

The configuration of the image pickup device 3 is not limited to this, provided that the image pickup device 3 has an image pickup function. The image pickup device 3 may be installed at other sites than the fifth arm 15, for example on the sixth arm 16 or the end effector 4.

Display Device

The display device 61 shown in FIG. 1 has a monitor made up of, for example, a liquid crystal display or the like, and has the function of displaying, for example, an image picked up by the image pickup device 3 and various processing screens (for example, an operation window or a screen for processing results). Therefore, the operator can grasp the image picked up by the image pickup device 3 and the work by the robot 1, or the like, via the display device 61.

Input Device

The input device 62 (input unit) is made up of, for example, a mouse, keyboard, teach pendant, or enable switch or the like. A plurality of input devices 62 may be provided. The input device 62 may be configured to recognize sounds (including voice).

The user can carry out an input operation using the input device 62 and thus can give various commands to the control device 5. The input operation may include, for example, clicking the mouse, inputting a letter using the keyboard, pressing a button on the teach pendant or canceling the pressing, pressing the enable switch or canceling the pressing, inputting a voice, or the like.

The display device 61 and the input device 62 may each be provided in plurality. Also, a display input device (not illustrated) having the functions of both the display device 61 and the input device 62 may be used instead of the display device 61 and the input device 62. As the display input device, for example, a touch panel (electrostatic touch panel or pressure-sensitive touch panel) or the like can be used.

Control Device

The control device 5 is a device which controls the driving of the robot 1 or the like. In this embodiment, the control device 5 is made up of a computer (for example, a PC (personal computer) or PLC (programmable logic controller) or the like) in which a program (OS (operating system)) is installed. The control device 5 has a CPU (central processing unit) as a processor, a RAM (random access memory), and a ROM (read only memory) or the like.

The control device 5 may be able to communicate with each of the robot 1, the force detection device 2, the end effector 4, and the image pickup device 3, and is connected to each of these by wireless communication or wired communication. The control device 5 is provided outside the robot 1 but may be incorporated inside the robot (see FIG. 1).

As shown in FIG. 2, the control device 5 has an output unit 51, an accepting unit 52, a control unit 53 (processing unit), and a storage unit 54, and is configured in such a way that these units can communicate data with each other.

Control Unit

The control unit 53 (processing unit) has the functions of performing various computations and controlling the driving of the robot 1 or the like. The functions of the control unit 53 can be implemented by a CPU executing various programs stored in the storage unit 54 (RAM, ROM or the like).

The control unit 53 recognizes a position within a real space, based on a base coordinate system (X-axis, Y-axis, and Z-axis) which is a three-dimensional orthogonal coordinate system, and recognizes the position and attitude of the tool center point P (more precisely, the position of the tool center point P and the attitude of the sixth axis of rotation O6) as coordinates (X, Y, Z).

In order to move the robot arm 10, the control unit 53 uses forward kinematics and thus finds the position and attitude of the tool center point P, based on the displacement of the angle of rotation of the axis of rotation provided in each of the drive units 130 corresponding to the arms 11 to 16, and also uses inverse kinematics and thus finds the displacement of the angle of rotation of the axis of rotation provided in each of the drive units 130 corresponding to the arms 11 to 16, based on the position and attitude of the tool center point P. For example, based on data of a relational expression (for example, the Jacobian matrix) expressing the relation between the displacement of the angle of rotation of the axis of rotation provided in each drive unit 130 and the position and attitude of the tool center point P, the control unit 53 finds the displacement of each angle of rotation and the position and attitude of the tool center point P and thus moves the robot arm 10.

The control unit 53 calibrates the image coordinate system (two-dimensional orthogonal coordinate system) of the image pickup device 3 and the base coordinate system (three-dimensional coordinate system) of the robot 1 and converts a position in a two-dimensional image picked up by the image pickup device 3 into a position in the real space on the base coordinate system (coordinate conversion). Thus, which position on the base coordinate system a position appearing in an image is located can be grasped.

The control unit 53 compares a target value (target angle of rotation of the axis of rotation of the drive unit 130) with an amount of control (actual angle of rotation of the axis of rotation of the drive unit 130), based on information acquired from the angle sensor 120, the force detection device 2, and the image pickup device 3, and controls an amount of operation (voltage applied to the drive unit 130). Thus, the tool center point P can be moved to a target site.

Storage Unit

The storage unit 54 has the function of storing (recording, saving) various programs and data. The function of the storage unit 54 can be implemented by a RAM (including, for example, a buffer), ROM, and external storage device (not illustrated) or the like.

Output Unit

The output unit 51 is made up of an output interface and outputs various signals to each of the robot 1, the force detection device 2, the end effector 4, the image pickup device 3, and the display device 61, under the control of the control unit 53. The signals outputted from the output unit 51 may be analog signals or digital signals.

Accepting Unit

The accepting unit 52 is made up of an input interface and accepts various signals outputted from each of the robot 1, the force detection device 2, the end effector 4, and the image pickup device 3, under the control of the control unit 53. The accepting unit 52 also accepts a command inputted form the input device 62.

The control device 5 described above may also have other functional units than the output unit 51, the accepting unit 52, the control unit 53, and the storage unit 54.

The basic configuration of the robot system 100 has been briefly described.

In such a robot system 100, the control device 5 drives the robot arm 10 in such a way as to position the tool center point P at a target site in response to a command based on an input operation by the operator with the input device 62. Specifically, when the control device 5 accepts a first command to move the tool center point P, the control device 5 executes first drive control to drive the robot arm 10 in such a way as to move the tool center point P toward a target site. When the control device 5 accepts a second command to return the tool center point P along the route taken in the first drive control, the control device 5 executes second drive control to drive the robot arm 10 in such a way as to return the tool center point P along the route.

First Drive Control and Second Drive Control

The first drive control and the second drive control will be described below.

Figure 3:
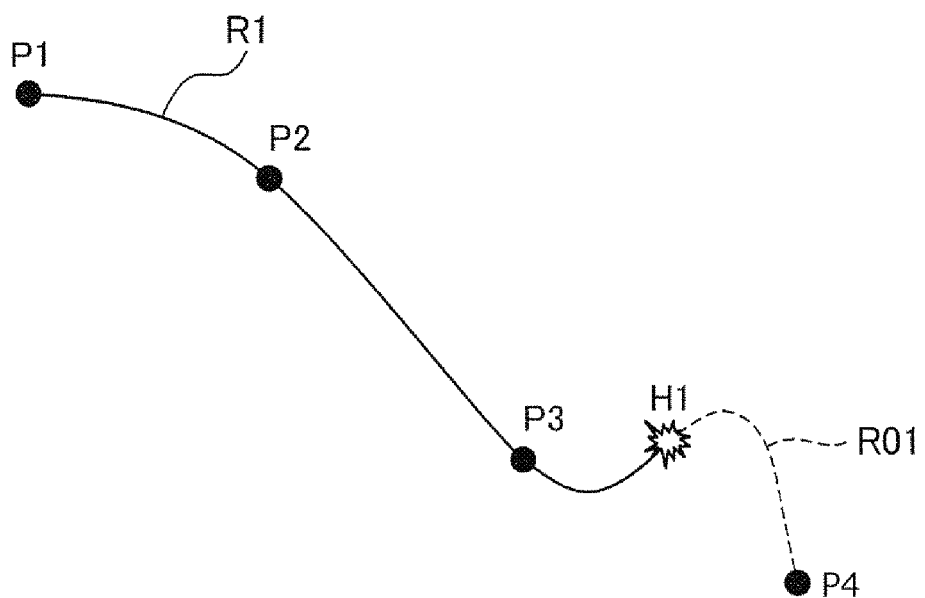
FIG. 3 shows a route of an axis coordinate from a taught point P1 to a taught point P4.
Figure 4:
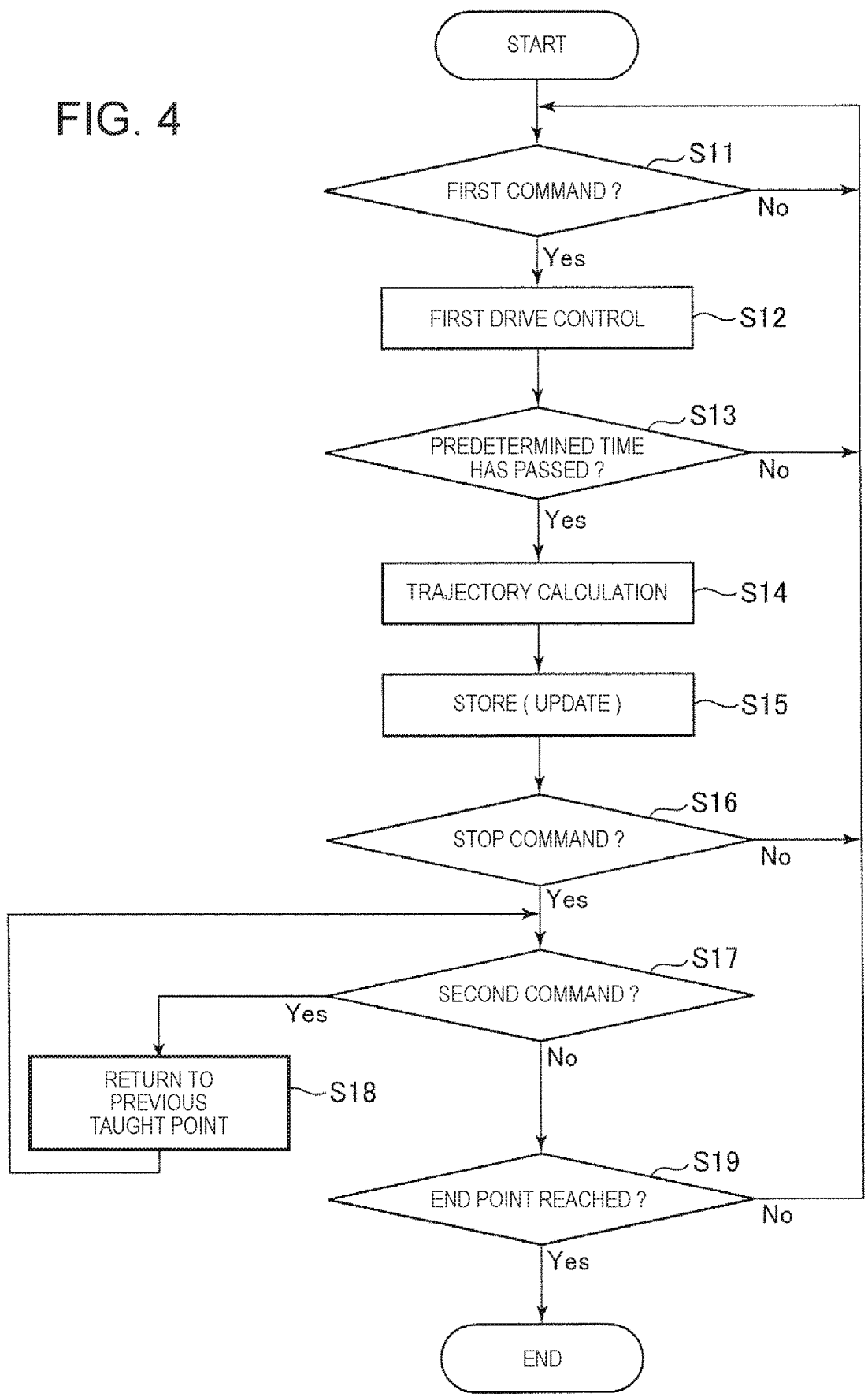
FIG. 4 is a flowchart showing an example of a movement to a target position of the axis coordinate.

FIG. 3 shows a route of an axis coordinate from a taught point P1 to a taught point P4. FIG. 4 is a flowchart showing an example of a movement of the axis coordinate to a target position.

In the example described below, in the first drive control, the tool center point P is moved from the taught point P1 toward the taught point P4 along a target trajectory R01 shown in FIG. 3 stored in advance in the storage unit 54, and in the second drive control, the tool center point P is returned to a taught point P3 along a route R1 traced by the tool center point P in the first drive control. The example will now be described, referring to the flow shown in FIG. 4.

First, as shown in FIG. 4, the control unit 53 determines whether the accepting unit 52 accepts a first command to move the tool center point P or not (step S11). The first command is a command given in response to an input operation by the user using the input device 62.

If the first command is accepted ("Yes" in step S11), the control unit 53 starts the first drive control to move the tool center point P toward the taught point P4 (step S12). If the first command is not accepted ("No" in step S11), the control unit 53 causes the robot 1 to wait until the first command is accepted.

Next, the control unit 53 determines whether a predetermined time has passed or not (step S13). If the predetermined time has passed ("Yes" in step S13), the control unit 53 carries out trajectory calculation (step S14) and causes the storage unit 54 to store the result of the calculation (step S15).

The trajectory calculation is to find the route R1 on which the tool center point P moves. Specifically, the trajectory calculation is to find information about a transit point through which the tool center point P passes (the angle of rotation of each drive unit 130 and the position and attitude of the tool center point P) on a predetermined cycle. For example, based on information about the current position (transit point) of the tool center point P or the like, information about the next position (transit point) to which the tool center point P moves is found. This makes it possible to move the tool center point P while correcting a discrepancy between the position of the tool center point P on the target trajectory R01 and the actual position. Also, a plurality of transit points is stored (saved), for example, in a buffer forming the storage unit 54.

Next, the control unit 53 determines whether information about temporary stop of the driving of the robot 1 (stop command) is detected or not (step S16).

If the accepting unit 52 accepts the stop command ("Yes" in step S16), the control unit 53 stops the first drive control to temporarily stop driving the robot arm 10, and then determines whether the accepting unit 52 accepts a second command to retract the tool center point P or not (step S17). The second command is a command given in response to an input operation by the user using the input device 62. For example, the operator can press a button (not illustrated) designating the second command on the input device 62, thus giving the second command to the control device 5. If the accepting unit 52 does not accept the stop command ("No" in step S16), the control unit 53 returns to step S11.

Next, if the second command is accepted ("Yes" in step S17), the control unit 53 carries out the second drive control to drive the robot arm 10 in such a way as to return the tool center point P along the route R1 traced by the tool center point P, and thus returns the tool center point P to the previous taught point P3 (step S18). For example, if the second command is received when the tool center point P is situated at a point H1, as shown in FIG. 3, the control unit 53 executes the second drive control, and thus returns the tool center point P to trace the route R1 and positions the tool center point P at the taught point P3 preceding the point H1. After the tool center point P returns to the previous taught point P3, the control unit 53 returns to step S17.

Meanwhile, if the second command is not accepted ("No" in step S17), the control unit 53 determines whether the taught point P4, which is the end point, is reached or not (step S19). If the taught point P4 is not reached ("No" in step S19), the control unit 53 returns to step S11. If the taught point P4 is reached ("Yes" in step S19), the control unit 53 ends the movement of the tool center point P.

As described above, the control device 5 controlling the driving of the robot 1 having the robot arm 10 includes: the accepting unit 52 accepting a command from the input device 62 (input unit) enabling an input operation; the control unit 53 controlling the driving of the robot 1 in response to the command accepted by the accepting unit 52; and the storage unit 54 storing information about the driving of the robot 1. The control unit 53 carries out the first drive control to move the tool center point P (predetermined part) of the robot arm 10 or the member connected to the robot arm 10 (in this embodiment, the end effector 4 connected to the robot arm 10) from the taught point P1 (first position) toward the taught point P4 (second position) if the accepting unit 52 accepts the first command to move the tool center point P, and the second drive control to move the tool center point P in such a way as to return along at least a part of, in this embodiment the entirety of, the route R1 which the tool center point P traces when moving from the taught point P1 toward the taught point P4, based on the information stored in the storage unit 54 (information about the route R1), if the accepting unit 52 accepts the second command to retract the tool center point P after the first command. The information stored in the storage unit 54 (information about the route R1) may be, for example, the result of the trajectory calculation or the like.

Such a control device 5 can carry out the second drive control and thus return the tool center point P to the previous position along the route R1, if the second command is accepted when the tool center point P is situated at the point H1 shown in FIG. 3. Therefore, for example, in the case of returning the tool center point P to avoid colliding with an obstacle, the tool center point P can be returned to the previous taught point P3, where the tool center point P does not collide with an obstacle. This can reduce the risk of the robot arm 10 coming into contact with another obstacle or the like when returning (retracting).

As described above, in the trajectory calculation in step S14, the control unit 53 finds the information about the transit point through which the tool center point P passes (the angle of rotation of each drive unit 130 and the position and attitude of the tool center point P) on a predetermined cycle. In step S15, the control unit 53 causes the storage unit 54 to store the information about the transit point found on the predetermined cycle. Therefore, the tool center point P can be returned to accurately follow the traced route R1, using the information about a plurality of transit points stored in the storage unit 54.

In the embodiment, the tool center point P is returned along the entirety of the traced route R1, as described above. However, the tool center point P may be returned along a part of the route R1. For example, if the storage unit 54 thins out in terms of time the plurality of transit points forming the route R1 and stores the resulting transit points, the tool center point P may be returned, based on the information of the stored transit points.

As described above, the control device 5 carries out the second drive control in response to the second command inputted from the input device 62 (steps S17, 18). That is, the control device 5 executes the second drive control in response to the input operation by the operator. Therefore, the tool center point P can be returned to the previous position not only if the robot arm 10 comes into contact with an obstacle or the like but also according to the intention of the operator.

In the embodiment, an example where the tool center point P is used as the "predetermined part" is described. However, the "predetermined part" may be any site of the robot arm 10 or a member connected to the robot arm 10 such as the end effector 4. The "predetermined part" may be other sites than the tool center point P, for example, the predetermined point P6 or the distal end of the fifth arm 15 or the like.

In the embodiment, an example where the "first position" is the taught point P1 and where the "second position" is the taught point P4 is described. However, the "first position" and the "second position" may be any positions. Therefore, for example, the "first position" may be the taught point P2 and the "second position" may be the taught point P3.

As described above, in the second drive control, the control unit 53 drives the robot arm 10 in such a way that the tool center point P (predetermined part) returns to the preset taught point P3.

Thus, for example, in the case of returning the tool center point P to avoid colliding with an obstacle, the tool center point P can be returned to the previous taught point P3, where the tool center point P does not collide with an obstacle. This can reduce the risk of the robot arm 10 coming into contact with another obstacle or the like when returning the tool center point P. Also, as described above, the movement of the tool center point P can be resumed from the taught point P3, where the predetermined part is returned. This can eliminate the time and effort of moving the tool center point P all over again.

Also, in the above description, the robot arm 10 is driven in such a way that the tool center point P returns to the taught point P3, which is immediately before. However, the control unit 53 can also return the tool center point P to the taught point P1, which is a plurality of points before, in response to an input operation. That is, in the second drive control, the control unit 53 can drive the robot arm 10 in such a way that the tool center point P (predetermined part) returns, tracing a plurality of taught points P1 to P3.

For example, the control unit 53 returns the tool center point P to a taught point that precedes by the same number of points as the number of times the operator presses the button (not illustrated) designating the second command on the input device 62. For example, if the operator presses the button (not illustrated) designating the second command three times, the control unit 53 returns the tool center point P to the taught point P1, which is three points before the point H1. In this way, the movement of the tool center point P can be resumed from the site intended by the operator. Also, the tool center point P can be returned to the taught point P1, which is a plurality of points before, in such a way as to trace a plurality of taught points P1 to P3. This can further reduce the risk of the robot arm 10 coming into contact with another obstacle when returning the tool center point P.

Figure 5:
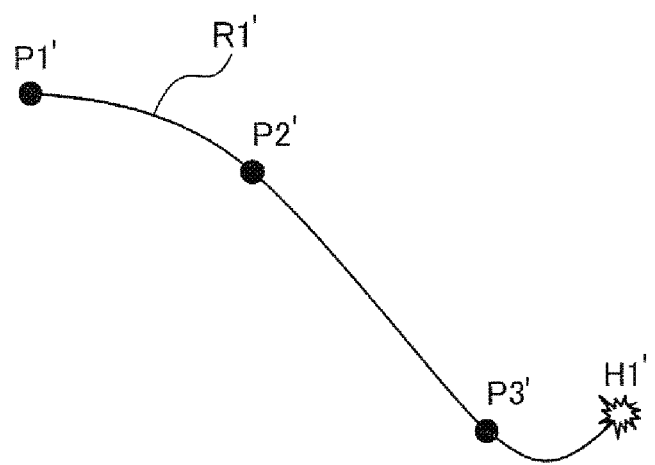
FIG. 5 shows a route of the axis coordinate from a taught point P1' to a taught point P3'.

As described above, if the accepting unit 52 accepts the second command after the driving of the robot 1 is temporarily stopped, the control unit 53 carries out the second drive control (see steps S16, 17 in FIG. 5). Thus, the second drive control can be carried out more accurately and stably than in the case where the second drive control is carried out without temporary stop.

Here, the temporary stop of the driving of the robot 1 refers to the state where the operation of the robot 1 is temporarily stopped during the operation of the robot 1.

Specifically, the control unit 53 temporarily stops the operation of the robot 1, in response to the following stop commands: (1) where an error (for example, a collision) occurs during the operation of the robot 1; (2) where the tool center point P reaches the taught point P4, which is the target position; (3) where an interrupt signal from an external device (a signal indicating that a safety door, not illustrated, around the robot 1 is opened) is detected; (4) where the operator presses an emergency stop button on the input device 62; and (5) where the operator cancels a press on the teach pendant or the enable switch, or the like.

The control unit 53 determines that it is the case of (1), (2), or (3), based on a signal outputted from one of the robot 1, the force detection device 2, the image pickup device 3, and another external device (not illustrated).

Also, in the robot system 100 according to this embodiment, the second drive control can be carried out according to the intention of the operator after the driving of the robot 1 is temporarily stopped in response to a stop command corresponding to the intention of the operator, as in the case of (4) and (5).

Modification 1

Figure 6:
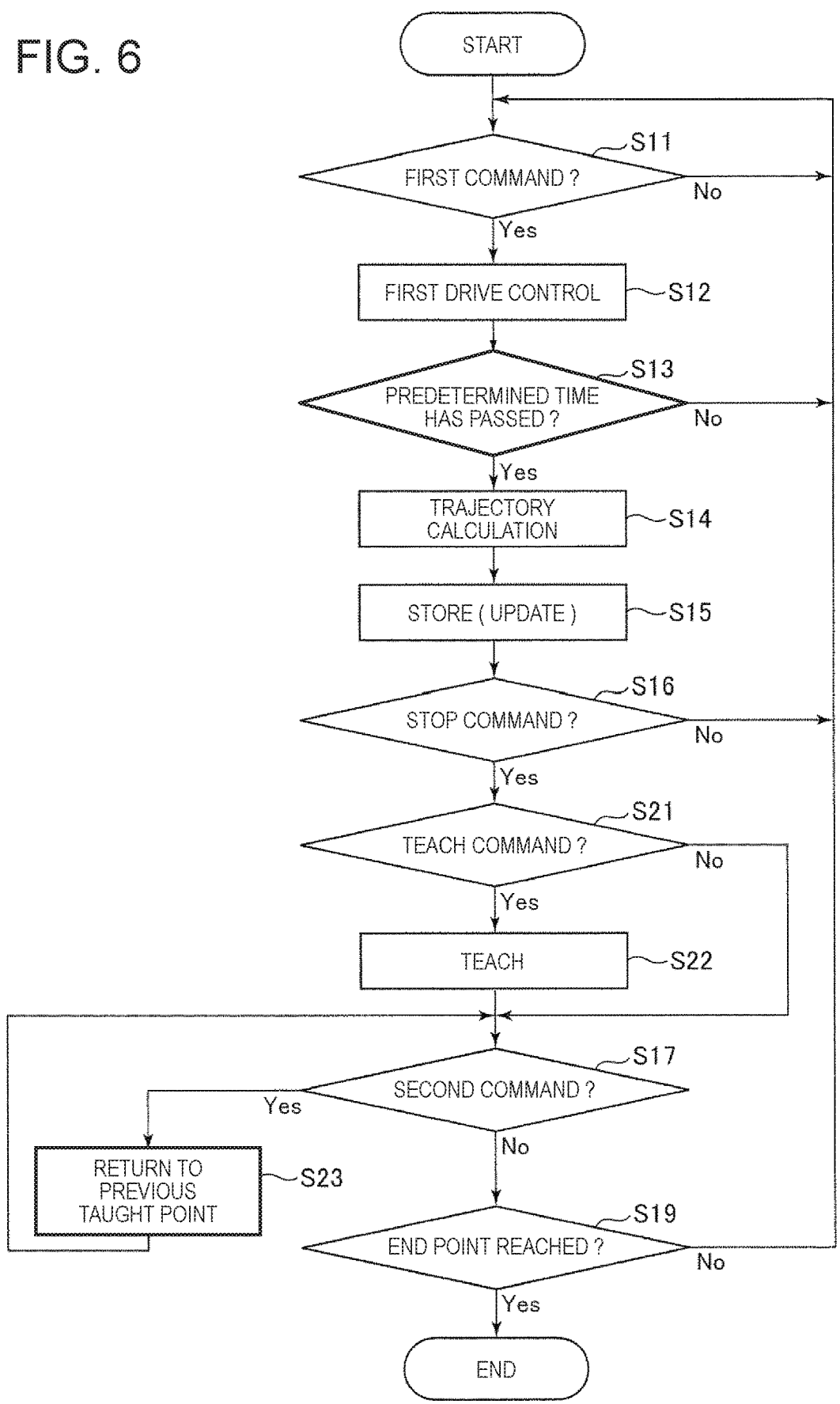
FIG. 6 is a flowchart showing a modification 1 of the movement of the axis coordinate.

FIG. 5 shows a route of the axis coordinate from a taught point P1' to a taught point P3'. FIG. 6 is a flowchart showing a modification 1 of the movement of the axis coordinate.

In the example described below, in the first drive control, the tool center point P is moved while taught points P1', P2', P3' are taught in response to input operations, instead of moving the tool center point P along the preset target trajectory R01, and in the second drive control, the tool center point P is returned to the taught point P3' on a route R1' traced by the tool center point P in the first drive control (see FIGS. 3 and 5). The example will now be described, referring to the flow shown in FIG. 6. Differences from the flowchart of FIG. 4 will be mainly described and similar matters will not be described further.

As shown in FIG. 6, if the accepting unit 52 accepts the stop command in step S16 ("Yes" in step S16), the control unit 53 determines whether a teach command teaching the current position of the tool center point P is accepted or not (step S21). The teach command is a command given in response to an input operation by the operator using the input device 62.

If the accepting unit 52 accepts the teach command ("Yes" in step S21), the control unit 53 teaches the current position of the tool center point P and causes the storage unit 54 to store the taught information (the angle of rotation of each drive unit 130 and the position and attitude of the tool center point P) (step S22). The control unit 53 causes the storage unit 54 (for example, a ROM or the like) to store the taught position of the tool center point P as the taught points P1' to P3'.

If the accepting unit 52 accepts the second command in step S17 ("Yes" in step S17), the control unit 53 carries out the second drive control and thus returns the tool center point P to the previous taught point P3' (step S23). For example, if the second command is accepted when the tool center point P is situated at a point H1', as shown in FIG. 5, the control unit 53 executes the second drive control, and thus returns the tool center point P to trace the route R1' and places the tool center point P at the taught point P3' preceding the point H1'.

In this way, in the second drive control, the control unit 53 drives the robot arm 10 in such a way that the tool center point P (predetermined part) returns to the taught point P3' taught in the first drive control.

Thus, for example, in the case of returning the tool center point P to avoid colliding with an obstacle, the tool center point P can be returned to the previous taught point P3', where the tool center point P does not collide with an obstacle. This can reduce the risk of the robot arm 10 coming into contact with another obstacle or the like when returning the tool center point P. Also, as described above, teaching can be resumed from the taught point P3', where the tool center point P is returned. This can eliminate the time and effort of teaching all over again and therefore enables efficient teaching.

Modification 2

Figure 7:
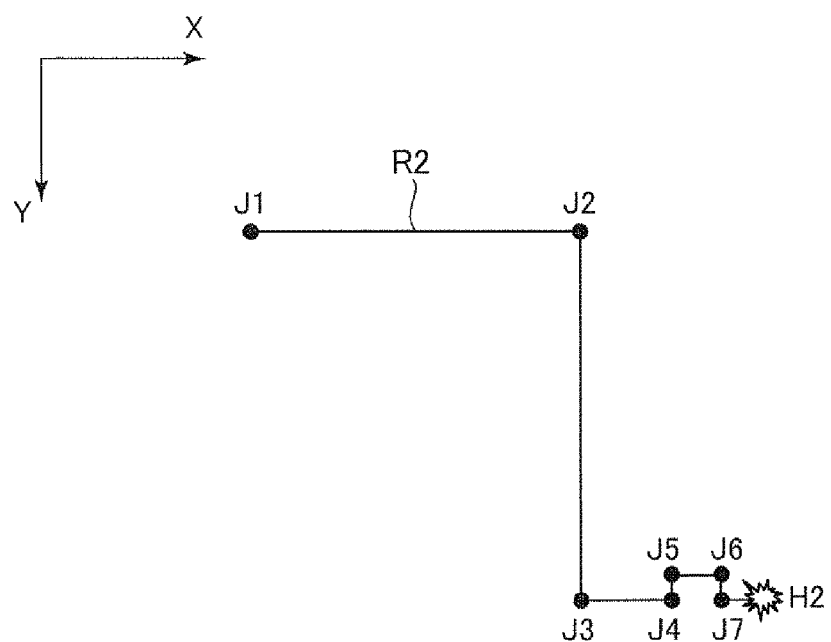
FIG. 7 shows a route of the axis coordinate from a stored point J1 to a stored point J7.
Figure 8:
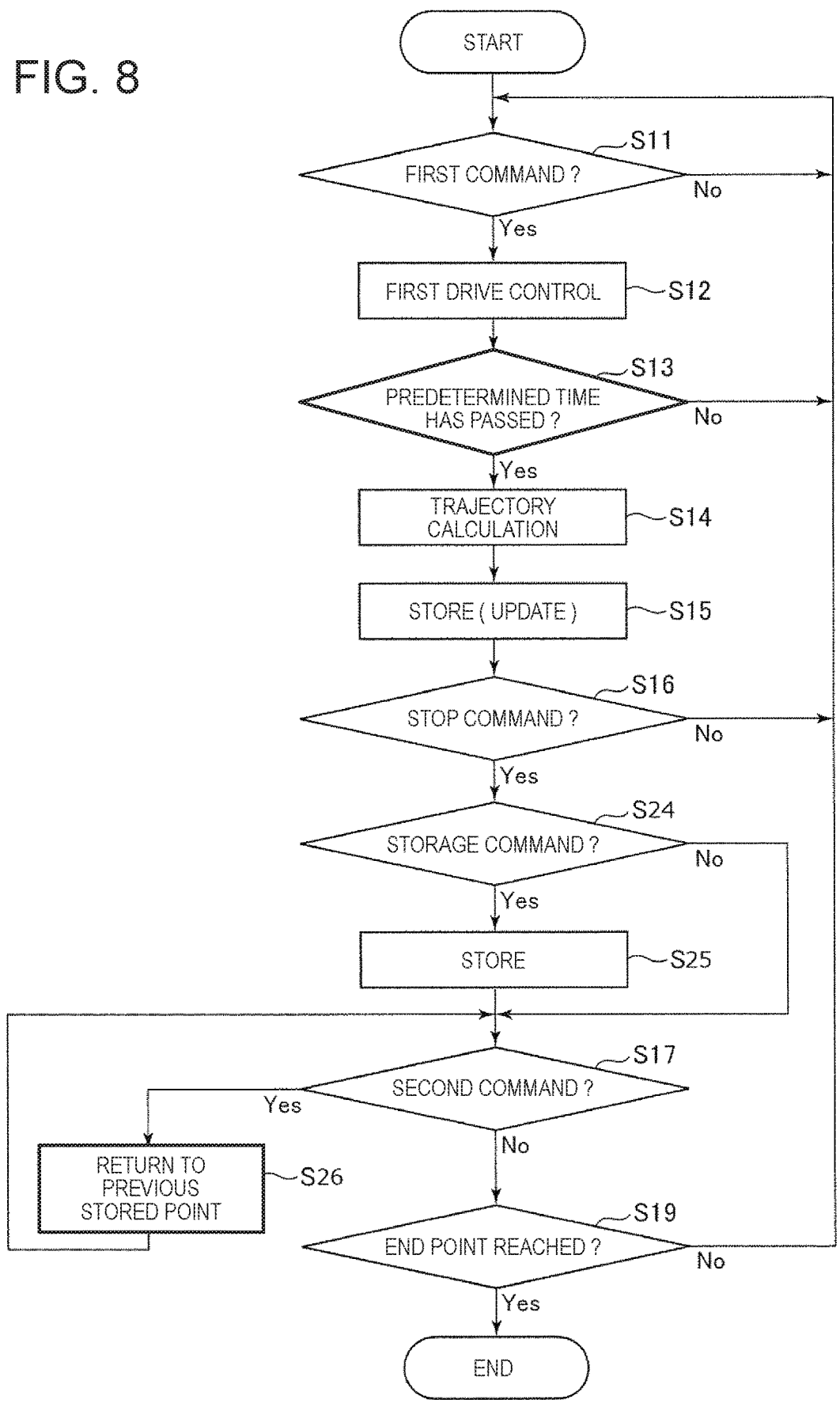
FIG. 8 is a flowchart showing a modification 2 of the movement of the axis coordinate.

FIG. 7 shows a route of the axis coordinate from a stored point J1 to a stored point J7. FIG. 8 is a flowchart showing a modification 2 of the movement of the axis coordinate.

In the example described below, in the first drive control, the tool center point P is moved while the position of the tool center point P is stored as stored points J1 to J7 without teaching the position, in response to input operations, and in the second drive control, the tool center point P is returned to the stored point J7 on a route R2 traced by the tool center point P in the first drive control (see FIG. 7). The example will now be described, referring to the flow shown in FIG. 8. Differences from the flowchart of FIG. 4 will be mainly described and similar matters will not be described further.

As shown in FIG. 8, if the accepting unit 52 accepts the stop command in step S16 ("Yes" in step S16), the control unit 53 determines whether a storage command to store the current position of the tool center point P without teaching this position is accepted or not (step S24). The storage command is a command given in response to an input operation by the operator using the input device 62. For example, the storage command is a command given by the operator canceling a press on a button on a teach pendant or an enable switch. The control device 5 in this embodiment is set to determine the cancelation of the press as the storage command.

If the accepting unit 52 accepts the storage command ("Yes" in step S24), the control unit 53 causes the storage unit 54 to store the current position of the tool center point P without teaching this position (step S25). For example, if the accepting unit 52 accepts the cancelation of a press on a button on a teach pendant by the operator when the tool center point P is being moved in the +X-axis direction from the stored point J1 in response to the press on the button, the control unit 53 causes the storage unit 54 to store the position of the tool center point P as the stored point J2 (see FIG. 7). Similarly, if the accepting unit 52 accepts the cancelation of a press on a button by the operator when the tool center point P is being moved in the +Y-axis direction from the stored point J2 in response to the press on the button, the control unit 53 causes the storage unit 54 to store the position of the tool center point P as the stored point J3. In this way, the control unit 53 causes the storage unit 54 (for example, a RAM or the like) to store the stored points J1 to J7.

If the accepting unit 52 accepts the second command in step S17 ("Yes" in step S17), the control unit 53 carries out the second drive control and thus returns the tool center point P to the previous stored point J7 (step S26). For example, if the second command is accepted when the tool center point P is situated at a point H2, as shown in FIG. 7, the control unit 53 executes the second drive control, and thus returns the tool center point P to trace the route R2 and places the tool center point P at the stored point J7 preceding the point H2.

In this way, in the first drive control, if the accepting unit 52 accepts the storage command to store the position of the tool center point P (predetermined part) without teaching this position, the control unit 53 causes the storage unit 54 to store the position of the tool center point P, for example, as the stored point J7. In the second drive control, the control unit 53 drives the robot arm 10 in such a way that the tool center point P returns to the stored point J7.

Thus, for example, in the case of returning the tool center point P to avoid colliding with an obstacle, the tool center point P can be returned to the previous stored point J7, where the tool center point P does not collide with an obstacle. This can reduce the risk of the robot arm 10 coming into contact with another obstacle or the like when returning. Also, work such as teaching can be resumed from the stored point J7, where the tool center point P is returned. This can eliminate the time and effort of doing the work all over again from the stored point J1.

The tool center point P can be returned not only to the immediately preceding stored point J7 but also to one of the stored points J1 to J7, which is a plurality of points before. For example, the control unit 53 returns the tool center point P to a stored point that precedes by the same number of points as the number of times the operator presses the button (not illustrated) designating the second command on the input device 62.

Also, in the first drive control, the control unit 53 can cause the storage unit 54 to store a plurality of stored points J1 to J7. In the second drive control, the control unit 53 can drive the robot arm 10 in such a way that the tool center point P returns, for example, tracing the stored points J1, J2, J3, and J7 of the plurality of stored points J1 to J7. In this case, the tool center point P does not pass through the stored points J4, J5, and J6.

Returning the tool center point P in such a way as to trace the stored points J1, J2, J3, and J7 of the plurality of stored points J1 to J7 in this manner can increase the efficiency of the second drive control. This can also reduce the number of stored points stored in the storage unit 54 and can simplify the control device 5.

Modification 3

Figure 9:
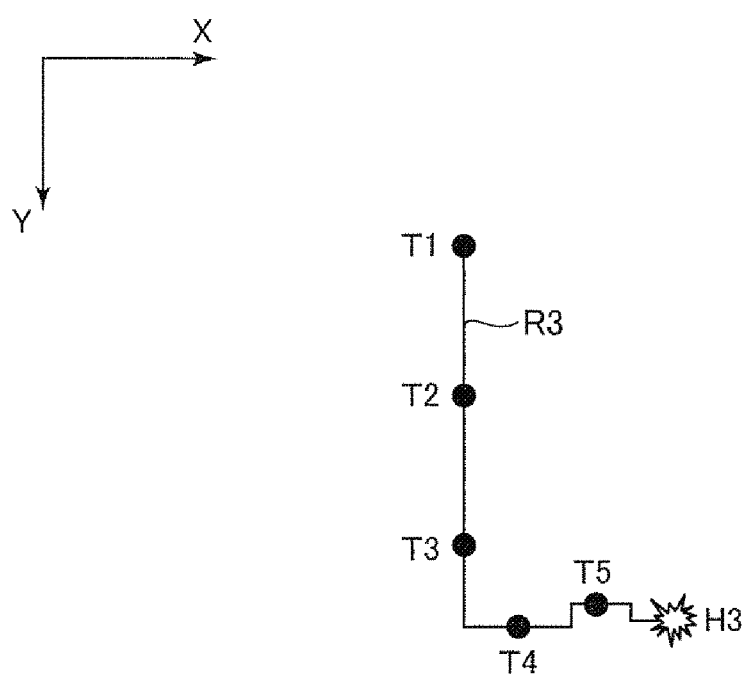
FIG. 9 shows a route of a predetermined part from a transit point T1 to a transit point T5.
Figure 10:
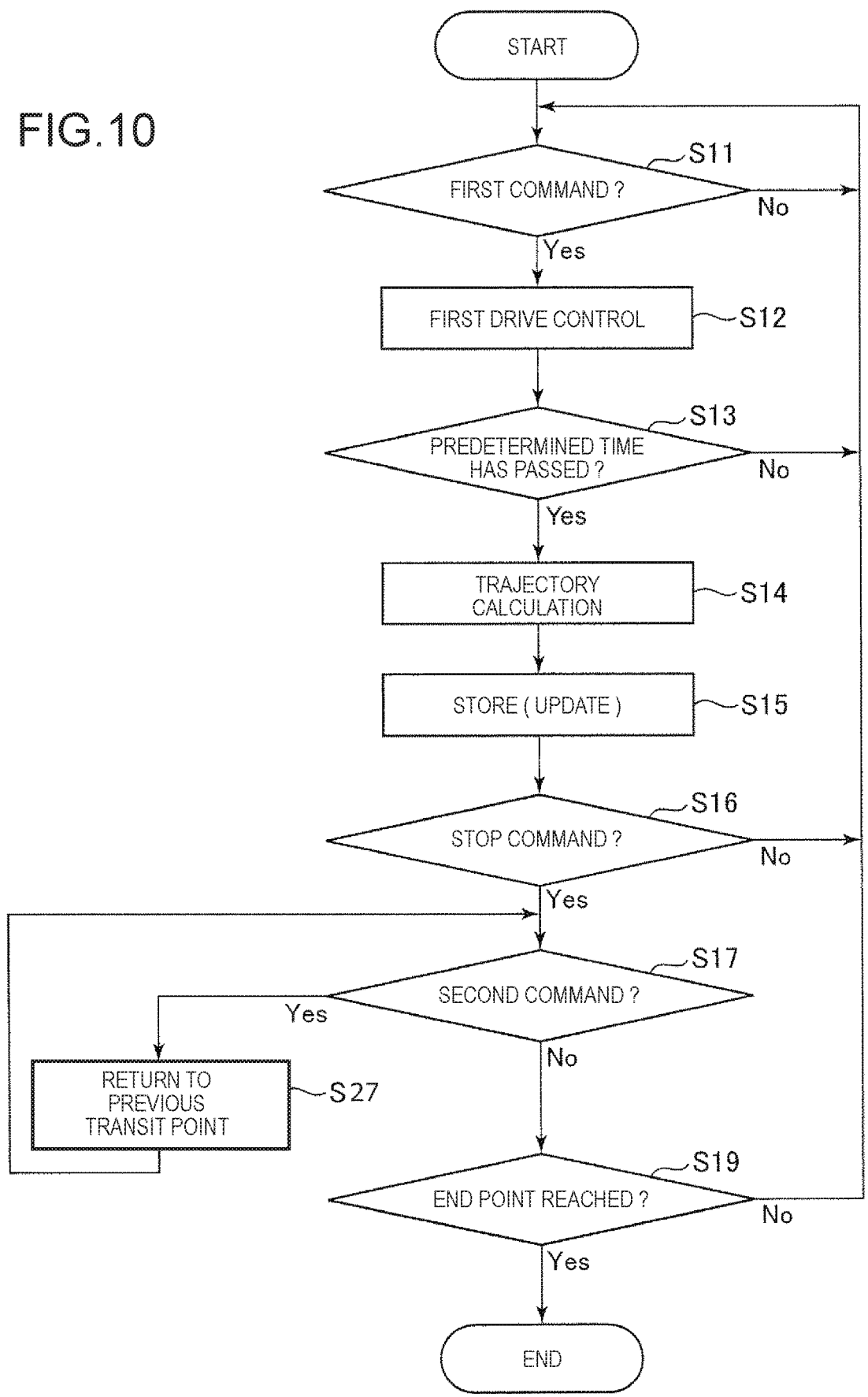
FIG. 10 is a flowchart showing a modification 3 of the movement of the axis coordinate.

FIG. 9 shows a route of the predetermined part from a transit point T1 to a transit point T5. FIG. 10 is a flowchart showing a modification 3 of the movement of the axis coordinate.

In the example described below, in the first drive control, the tool center point P is moved according to a preset operation program, and in the second drive control, the tool center point P is returned to the transit point T5 on a route R3 traced by the tool center point P in the first drive control (see FIG. 9). The example will now be described, referring to the flow shown in FIG. 10. Differences from the flowchart of FIG. 4 will be mainly described and similar matters will not be described further.

In steps S13, S14, the transit points T1 to T5 are stored with every lapse of a predetermined time (see FIGS. 9 and 10).

If the accepting unit 52 accepts the second command in step S17 ("Yes" in step S17), the control unit 53 carries out the second drive control and thus returns the tool center point P to the previous transit point T5 (step S27). For example, if the second command is accepted when the tool center point P is situated at a point H3, as shown in FIG. 9, the control unit 53 executes the second drive control, and thus returns the tool center point P to trace the route R3 and places the tool center point P at the transit point T5 preceding the point H3.

In this way, in the first drive control, the control unit 53 causes the storage unit 54 to store a plurality of transit points T1 to T5 on the route R3 traced by the tool center point P (predetermined part), on a predetermined cycle. In the second drive control, the control unit 53 drives the robot arm 10 in such a way that the tool center point P returns to the arbitrary transit point T5 of the plurality of transit points T1 to T5.

Thus, the tool center point P can be returned to the previous position, even without setting the taught points P1 to P4 in advance or carrying out input operations to set the taught points P1' to P3' or the stored points J1 to J7.

The tool center point P can be returned not only to the immediately preceding transit point T5 but also to one of the transit points T1 to T5, which is a plurality of points before. For example, the input device 62 is configured in such a way that the operator can input how many hours ago it should go back. The control unit 53 can return the tool center point P to the transit point that precedes by the time inputted to the input device 62.

Also, in the second drive control, the control unit 53 can drive the robot arm 10 in such a way that the tool center point P (predetermined part) returns, for example, tracing the transit points T1, T3, and T5 of the plurality of transit points T1 to T5. In this case, the tool center point P does not pass through the transit points T2 and T4.

Returning the tool center point P in such a way as to trace the transit points T1, T3, and T5 of the plurality of transit points T1 to T5 in this manner can increase the efficiency of the second drive control. This can also reduce the number of transit points stored in the storage unit 54 and can simplify the control device 5.

Modification 4

Figure 11:
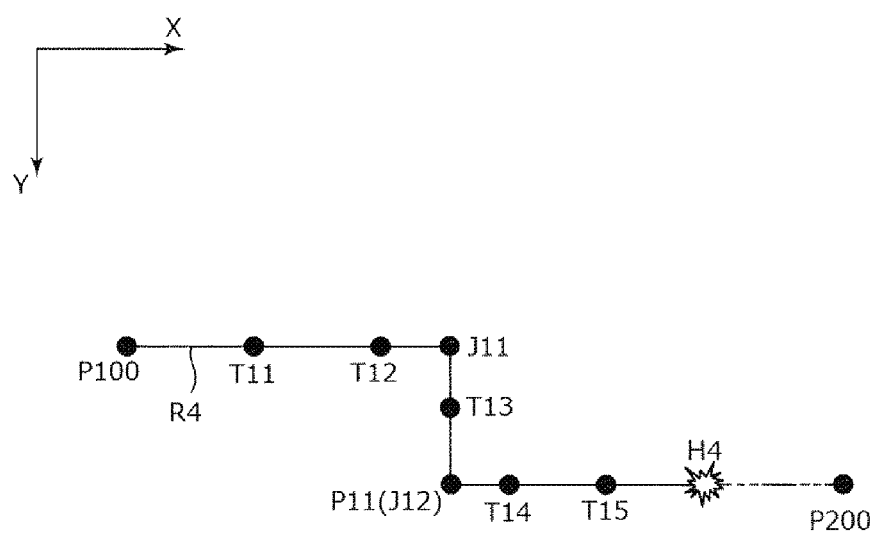
FIG. 11 shows a route of the axis coordinate from a start point P100 to an end point P200.
Figure 12:
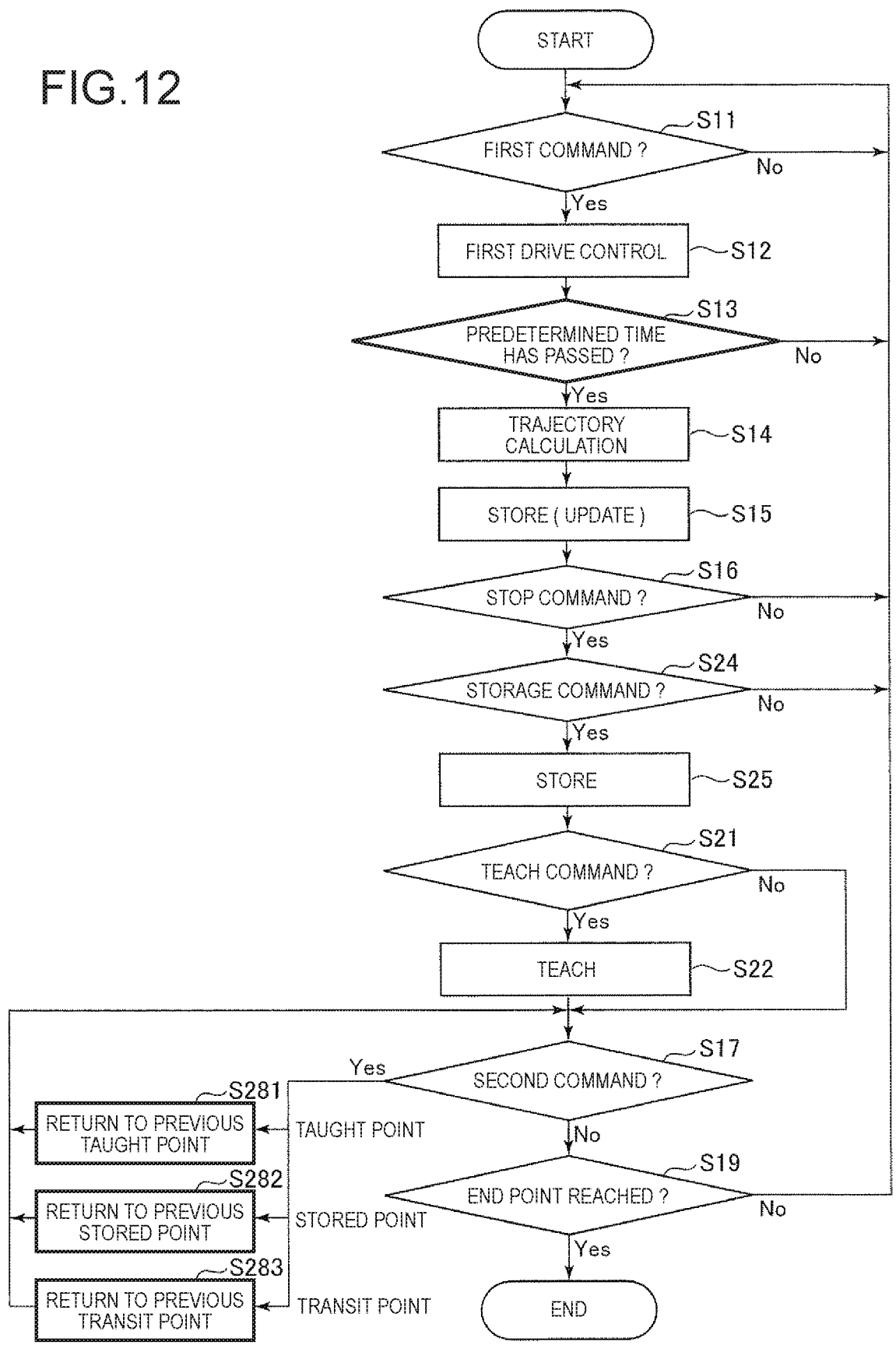
FIG. 12 is a flowchart showing a modification 4 of the movement of the axis coordinate.

FIG. 11 shows a route of the axis coordinate from a start point P100 to an end point P200. FIG. 12 is a flowchart showing a modification 4 of the movement of the axis coordinate.

In the example described below, in the first drive control, the tool center point P is moved from the start point P100 toward the end point P200 while taught points, stored points, and transit points are stored, and in the second drive control, the tool center point P is returned to a desired point of the taught points, the stored points, and the transit points (see FIG. 11). The example will now be described, referring to the flow shown in FIG. 12. Differences from the flowcharts of FIGS. 6, 8, and 10 will be mainly described and similar matters will not be described further.

If a predetermined time has passed ("Yes" in step S13) after the first drive control is started (step S12), the control unit 53 carries out trajectory calculation (step S14) and stores the result of the calculation (step S15). Thus, a plurality of transit points T11 to T15 is stored in the course of moving from the start point P100 to the end point P200, as shown in FIG. 11.

If the accepting unit 52 accepts the storage command in step S24 ("Yes" in step S24), the control unit 53 causes the storage unit 54 to store the current position of the tool center point P without teaching this position (step S25). Thus, a plurality of stored points J11, J12 is stored in the course of moving from the start point P100 to the end point P200, as shown in FIG. 11.

If the accepting unit 52 accepts the teach command in step S21 ("Yes" in step S21), the control unit 53 teaches the current position of the tool center point P and causes the storage unit 54 to store the taught information (step S22). Thus, a taught point P11 is stored in the course of moving from the start point P100 to the end point P200, as shown in FIG. 11. The taught point P11 and the stored point J12 coincide with each other.

If the accepting unit 52 in step S17 accepts the second command when the tool center point P is situated, for example, at a point H4 as shown in FIG. 11 ("Yes" in step S17), the control unit 53 determines which of the taught point P11, the stored points J11, J12, and the transit points T11 to T15 the tool center point P should return to, based on the content of the accepted second command.

If it is a command to return to the taught point P11, the control unit 53 carries out the second drive control and thus returns the tool center point P to the previous taught point P11, tracing a router R4 (step S281). If it is a command to return to the stored point J11 or the stored point J12, the control unit 53 carries out the second drive control and thus returns the tool center point P to the previous stored point J11 or the previous stored point J12, tracing the route R4 (step S282). If it is a command to return to one of the transit points T11 to T15, the control unit 53 carries out the second drive control and thus returns the tool center point P to one of the previous transit points T11 to T15, tracing the route R4 (step S283).

In this way, the control unit 53 can return the tool center point P to one of the taught point P11, the stored points J11, J12, and the transit points T11 to T15, according to the content of the second command, that is, according to the intention of the operator. Being able to select a position where the tool center point P is returned in this manner can enhance the convenience of the robot system 100.

Modification 5

Figure 13:
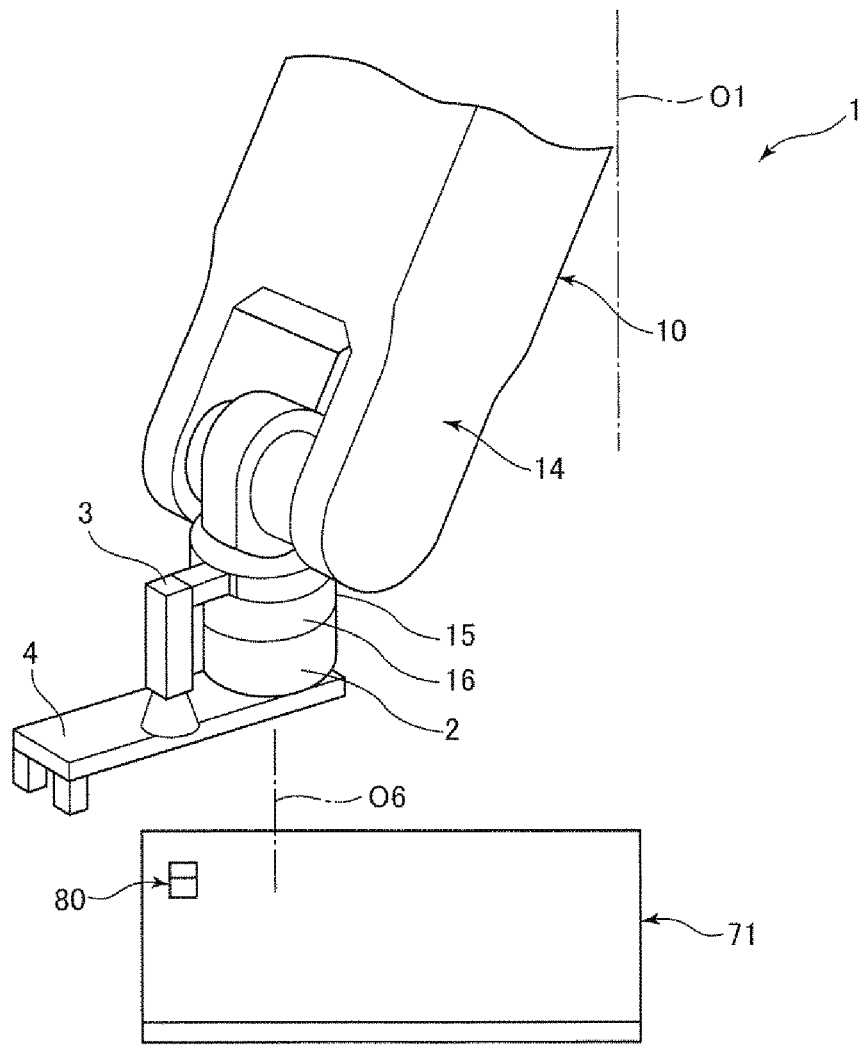
FIG. 13 shows the state where an end effector is situated within the field of view of an image pickup device.
Figure 14:
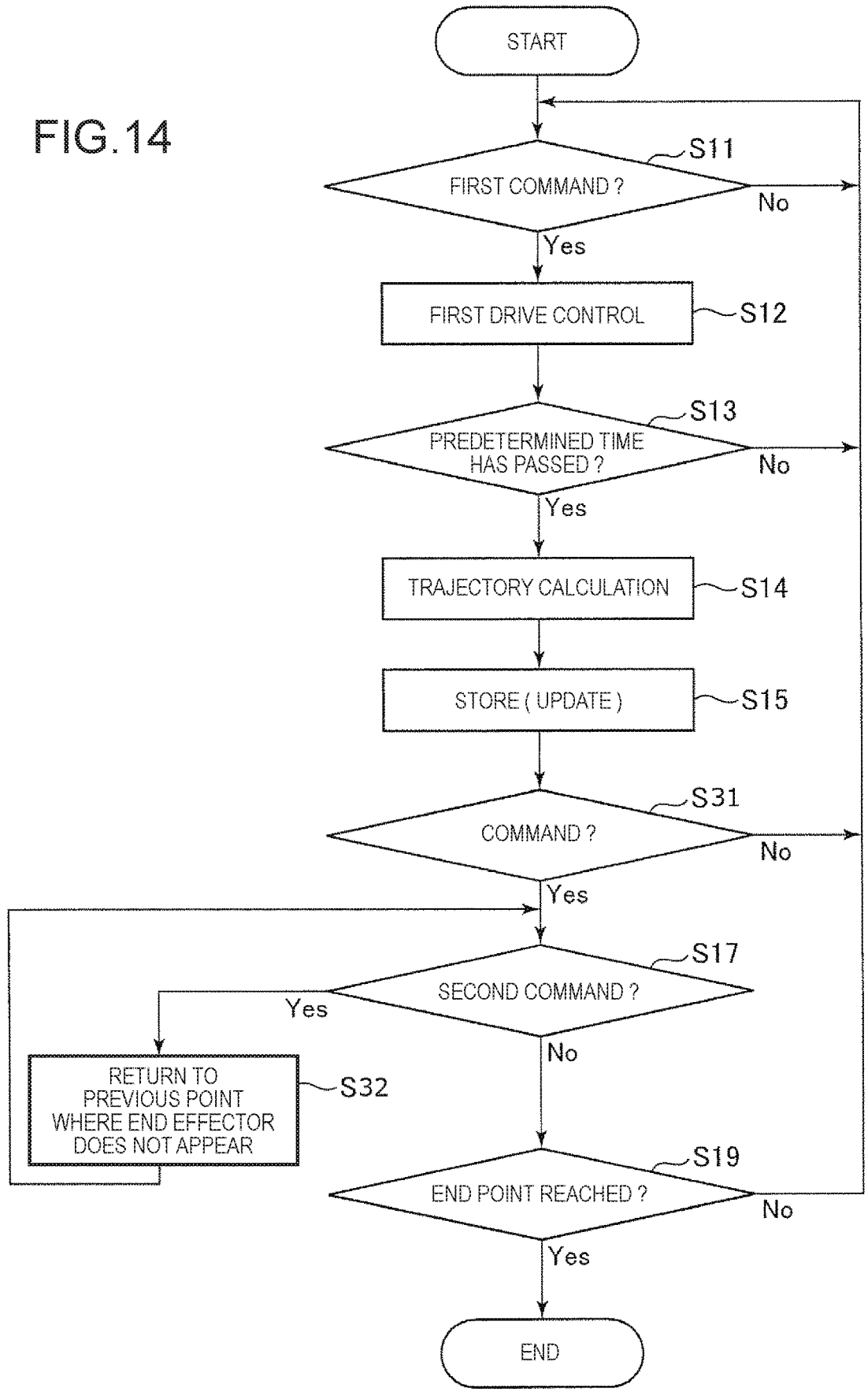
FIG. 14 is a flowchart showing a modification 5 of the movement of the axis coordinate.

FIG. 13 shows the state where the end effector is situated within the field of view of the image pickup device. FIG. 14 is a flowchart showing a modification 5 of the movement of the axis coordinate.

In the example described below, if the end effector 4 enters the field of view of the image pickup device 3, the second drive control is carried out to return the tool center point P to a position where the end effector is not situated within the field of view of the image pickup device 3 (see FIGS. 1 and 13). The example will now be described, referring to the flow shown in FIG. 14. Differences from the flowchart of FIG. 4 will be mainly described and similar matters will not be described further.

For example, in the state of the robot arm 10 shown in FIG. 1, the end effector 4 is not situated directly below the image pickup device 3 and therefore is not situated within the field of view of the image pickup device 3. In contrast, as the sixth arm 16 rotates, the end effector 4 installed on the sixth arm 16 may enter the field of view of the image pickup device 3 installed on the fifth arm 15, as shown in FIG. 13. In such a case, the image pickup device 3 has its field of view blocked by the end effector 4 and therefore cannot pick up an image of the target object 80.

Thus, if the accepting unit 52 accepts a command that a part of the robot 1 or a part of the end effector 4 is situated within the field of view of the image pickup device 3 ("Yes" in step S31), and accepts the second command ("Yes" in step S17), the control unit 53 returns the tool center point P to a position (for example, a transit point) where the end effector 4 does not appear in the field of view of the image pickup device 3 (step S32).

In this way, the image pickup device 3 can be installed on the robot 1. If the accepting unit 52 accepts that a part of the end effector 4 as a member connected to the robot arm 10 (or a part of the robot 1) appears in a picked-up image by the image pickup device 3, based on an output (image data) from the image pickup device 3, the control unit 53, in the second drive control, drives the robot arm 10 in such a way that the tool center point P (predetermined part) returns to a position where a part of the end effector 4 (or a part of the robot 1) does not appear in the field of view of the image pickup device 3 and hence in the picked-up image.

This can further reduce the risk of the robot arm 10 coming into contact with another obstacle or the like when returning the tool center point P to a position where a part of the robot 1 or a part of the end effector 4 does not appear in the picked-up image. Also, based on the image information from the image pickup device 3, the robot 1 can carry out work efficiently.

Data or the like when a part of the robot 1 or a part of the end effector 4 appears in the picked-up image by the image pickup device 3 is stored in the storage unit 54. This enables the control unit 53 to compare the image data accepted by the accepting unit 52 with the data stored in the storage unit 54 and determine whether a part of the robot 1 or a part of the end effector 4 is situated within the field of view of the image pickup device 3 or not, that is, whether a part of the robot 1 or a part of the end effector 4 appears in the picked-up image or not.

The robot system 100 has been described above. As described above, the robot system 100 has the control device 5 and the robot 1 controlled by the control device 5.

In such a robot system 100, under the control of the control device 5, the risk of the robot 1 coming into contact with an obstacle or the like can be reduced. Thus, the robot 1 can carry out work or the like more safely and more efficiently.

Second Embodiment

Next, a second embodiment of the invention will be described.

Figure 15:
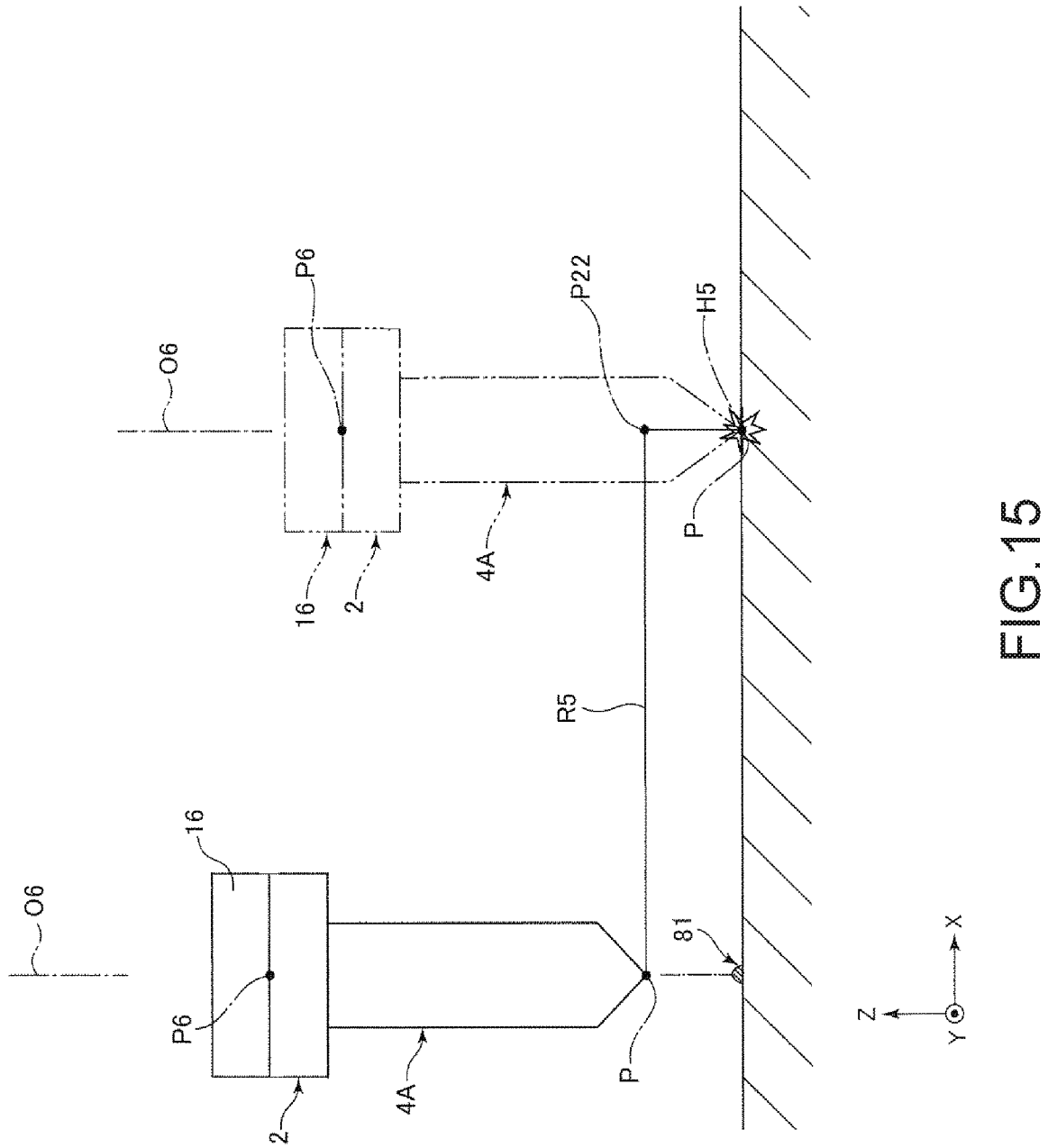
FIG. 15 shows an end effector in a robot system according to a second embodiment.
Figure 16:
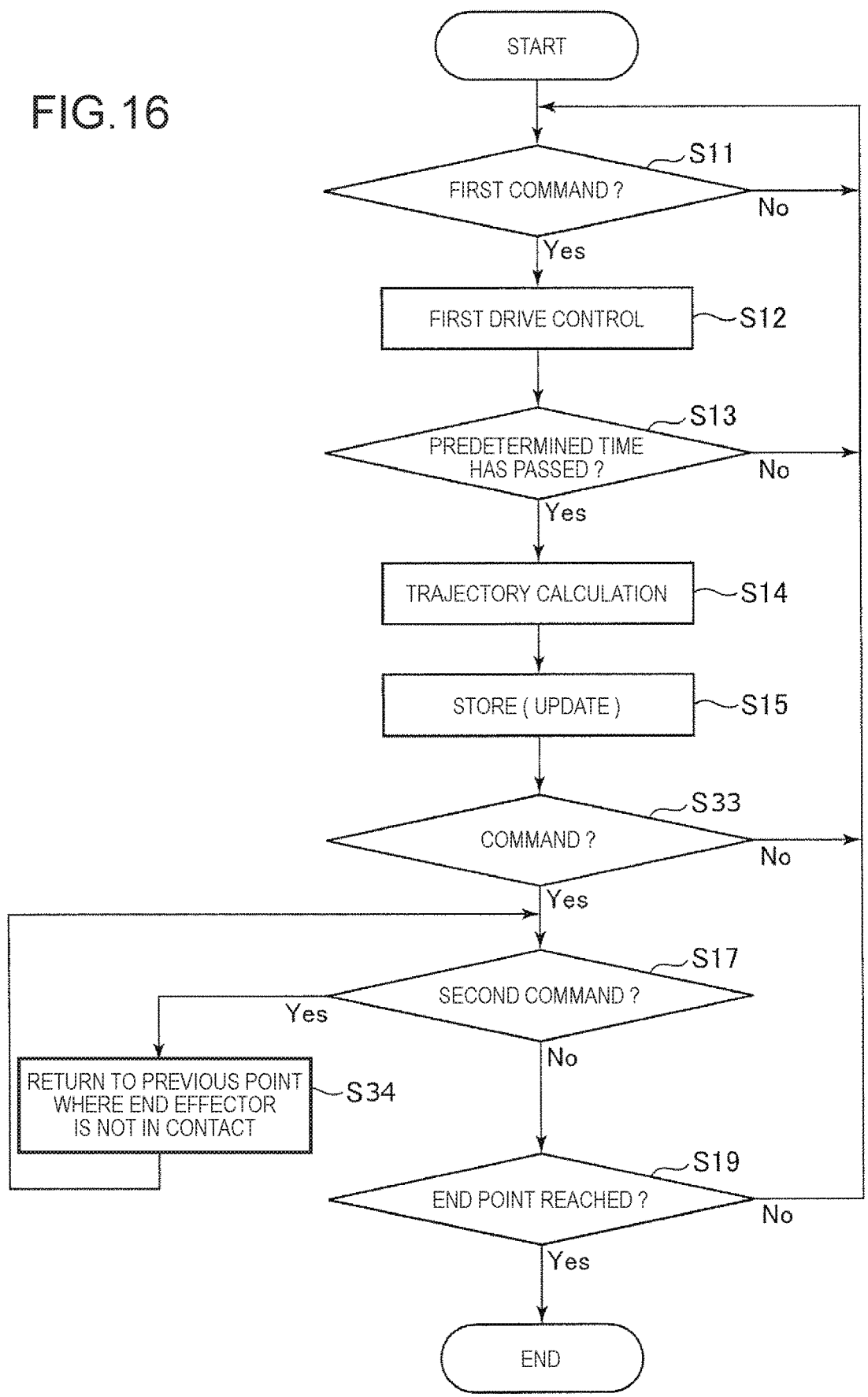
FIG. 16 is a flowchart showing an example of the movement of the axis coordinate.

FIG. 15 shows an end effector in a robot system according to the second embodiment. FIG. 16 is a flowchart showing an example of the movement of the axis coordinate.

This embodiment is different from the foregoing embodiment mainly in the configuration of the end effector. In the description below, differences of the second embodiment from the foregoing embodiment will be mainly described and similar matters will not be described further.

An end effector 4A shown in FIG. 15 is made up of a dispenser (ejection unit) which ejects a droplet 81 of adhesive or the like.

The first drive control and the second drive control in coating by this end effector 4A will now be described. The description below refers to the flow shown in FIG. 16. Differences from the flowchart of FIG. 4 will be mainly described and similar matters will not be described further.

In the description below, in the first drive control in step S12, the control unit 53 moves the tool center point P in the +X-axis direction while causing the end effector 4A to eject the droplet 81 onto the target object 80 in the state where the distal end of the end effector 4A is spaced apart from the target object 80. For example, the end effector 4A indicated by solid lines in FIG. 15 is moved in the +X-axis direction.

If the accepting unit 52 accepts a command that the end effector 4A is in contact with the target object 80 ("Yes" in step S33), and accepts the second command ("Yes" in step S17), the control unit 53 returns the tool center point P to a position (for example, a transit point) where the end effector 4A is not in contact with the target object (step S34). The control unit 53 detects that the end effector 4A is in contact with the target object 80, based on a signal outputted from the force detection device 2.

For example, if the second command is accepted when the tool center point P is situated at a point H5, as in the end effector 4A indicated by chain double-dashed lines in FIG. 15, the control unit 53 executes the second drive control, and thus returns the tool center point P to trace a route R5 and places the tool center point P at a point P22 preceding the point H5. That is, the tool center point P is returned, tracing the route R5, from the point H5, where the end effector 4A is in contact with the target object 80, to the point P22, where the end effector 4A is not in contact with the target object 80.

In this way, it is preferable that the force detection device 2 can be installed on the robot 1, and that if the accepting unit 52 accepts that the end effector 4A as a member connected to the robot arm 10 (or the robot 1) is in contact with the target object 80, based on an output from the force detection device 2, the control unit 53, in the second drive control, drives the robot arm 10 in such a way that the tool center point P (predetermined part) returns to a position where the end effector 4A (or the robot 1) is not in contact with the target object 80.

This can further reduce the risk of the robot arm 10 coming into contact with another obstacle or the like when retracting the predetermined part from the target object 80.

The control device, the robot, and the robot system according to the invention have been described, based on the illustrated embodiments. However, the invention is not limited to these embodiments. The configuration of each part can be replaced by any configuration having similar functions. Any other component may be added to the invention. The embodiments may be suitably combined together.

The robot according to the invention may be other types of robots than the vertically articulated robot. A SCARA robot or a parallel link robot may be employed.

The entire disclosure of Japanese Patent Application No. 2017-114063, filed Jun. 9, 2017 is expressly incorporated by reference herein.

What is claimed is:

1. A control device comprising:
a memory configured to store computer-executable instructions; and
a processor configured to execute the computer-executable instructions
so as to:
perform first drive control to move a predetermined part of an robot arm of a robot or an end effector connected to the robot arm from a first position toward a second position along a first track when the processor accepts a first command;
store first information relating to the first track into the memory;
store second information relating to a third position on the first track into the memory, the third position corresponding to a position when the processor accepts a second command; and
perform second drive control to move the predetermined part from the third position toward the first position along at least a part of a reverse track of the first track based on the first information and the second information stored in the memory when the processor accepts the second command after the processor performed the first drive control,
wherein the first information corresponds to a fourth position on the first track,
when the processor accepts a storage command to store the fourth position of the predetermined part without teaching the fourth position during the first drive control, the processor stores the first information corresponding to the fourth position into the memory, and
when the processor accepts the second command, the processor is configured to move the predetermined part from the third position and maintain the predetermined part at the fourth position.

2. The control device according to claim 1,
wherein the processor is configured to perform the second drive control after the driving of the robot is temporarily stopped.

3. The control device according to claim 1,
wherein the first information corresponds to a plurality of other positions on the first track,
when the processor accept a plurality of the storage commands to store the plurality of other positions of the predetermined part without teaching the plurality of other positions during the first drive control, the processor stores the first information corresponding to the plurality of other positions into the memory, and
when the processor accept the second command, the processor is configured to move the predetermined part from the third position, make the predetermined part to pass through the plurality of other positions, and maintain the predetermined part at the fourth position.

4. The control device according to claim 1,
wherein in the first drive control, the processor is configured to cause the memory to store a plurality of transit positions on the first track traced by the predetermined part, on a predetermined cycle,
one of the plurality of transit positions is the fourth position, and
in the second drive control, the processor is configured to drive the robot arm in such a way that the predetermined part returns to the fourth position.

5. The control device according to claim 4,
wherein in the second drive control, the processor is configured to drive the robot arm in such a way that the predetermined part returns to the forth position after the predetermined part passes through another of the plurality of transit positions.

6. The control device according to claim 1,
wherein a force detection device is installable on the robot, and
when the processor accepts an output from the force detection device that corresponds to a case in which the robot or the end effector is in contact with a target object, the processor is configured to drive the robot arm in such a way that the predetermined part returns to a position where the robot or the end effector is not in contact with the target object.

7. The control device according to claim 1,
wherein an image pickup device is installable on the robot, and
when the processor accepts an output from the image pickup device that corresponds to a case in which a part of the robot or a part of the end effector appears in a picked-up image by the image pickup device, the processor is configured to drive the robot arm in such a way that the predetermined part returns to a position where the part of the robot or the part of the end effector does not appear in a field of vision of the image pickup device, and the field of vision corresponds to the picked-up image.

8. A robot system comprising:
a robot having an robot arm and an end effector connected to the robot arm; and
a control device, the control device including:
a memory configured to store computer-executable instructions; and
a processor configured to execute the computer-executable instructions so as to:
perform first drive control to move a predetermined part of the robot arm or the end effector from a first position toward a second position along a first track when the processor accepts a first command;
store first information relating to the first track into the memory;
store second information relating to a third position on the first track into the memory, the third position corresponding to a position when the processor accepts a second command; and
perform second drive control to move the predetermined part from the third position toward the first position along at least a part of a reverse track of the first track based on the first information and the second information stored in the memory when the processor accepts the second command after the processor performed the first drive control,
wherein the first information corresponds to a fourth position on the first track,
when the processor accepts a storage command to store the fourth position of the predetermined part without teaching the fourth position during the first drive control, the processor stores the first information corresponding to the fourth position into the memory, and when the processor accepts the second command, the processor is configured to move the predetermined part from the third position and maintain the predetermined part at the fourth position.

9. The robot system according to claim 8, wherein the processor is configured to perform the second drive control after the driving of the robot is temporarily stopped.

10. The robot system according to claim 8, wherein the first information corresponds to a plurality of other positions on the first track, when the processor accept a plurality of the storage commands to store the plurality of other positions of the predetermined part without teaching the plurality of other positions during the first drive control, the processor stores the first information corresponding to the plurality of other positions into the memory, and when the processor accept the second command, the processor is configured to move the predetermined part from the third position, make the predetermined part to pass through the plurality of other positions, and maintain the predetermined part at the fourth position.

11. The robot system according to claim 8, wherein in the first drive control, the processor is configured to cause the memory to store a plurality of transit positions on the first track traced by the predetermined part, on a predetermined cycle, one of the plurality of transit positions is the fourth position, and in the second drive control, the processor is configured to drive the robot arm in such a way that the predetermined part returns to the fourth position.

12. The robot system according to claim 11, wherein in the second drive control, the processor is configured to drive the robot arm in such a way that the predetermined part returns to the forth position after the predetermined part passes through another of the plurality of transit positions.

13. The robot system according to claim 8, wherein the robot has a force detection device, and when the processor accepts an output from the force detection device that corresponds to a case in which the robot or the end effector is in contact with a target object, the processor is configured to drive the robot arm in such a way that the predetermined part returns to a position where the robot or the end effector is not in contact with the target object.

14. The robot system according to claim 8, wherein the robot has an image pickup device, and when the processor accepts an output from the image pickup device that corresponds to a case in which a part of the robot or a part of the end effector appears in a picked-up image by the image pickup device, the processor is configured to drive the robot arm in such a way that the predetermined part returns to a position where the part of the robot or the part of the end effector does not appear in a field of vision of the image pickup device, and the field of view corresponds to the picked-up image.

* * * * *